Nov. 24, 1942.   W. L. POLLARD   2,302,714
TRANSMISSION AND CONTROLLER
Filed April 7, 1941   6 Sheets-Sheet 1
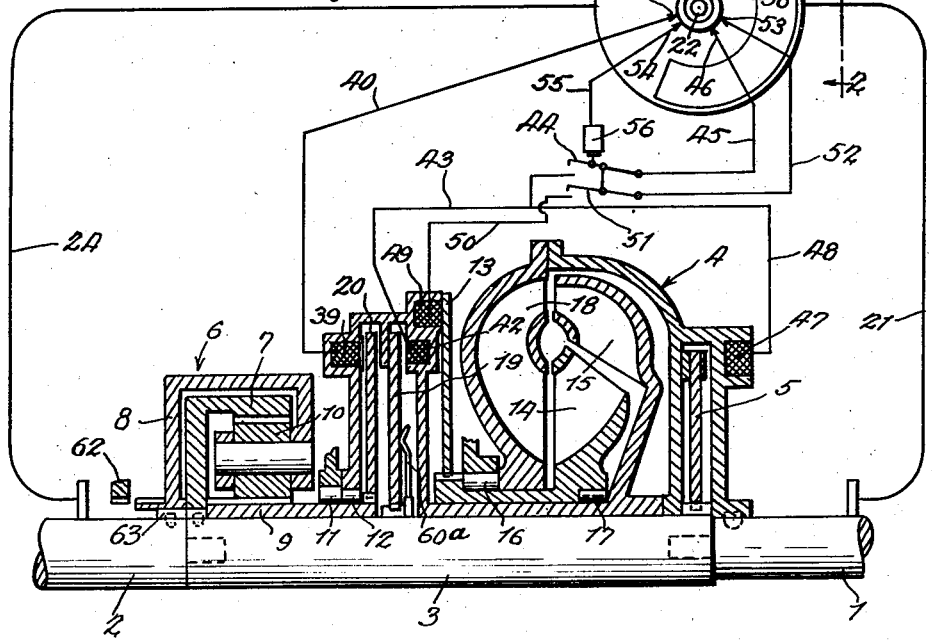
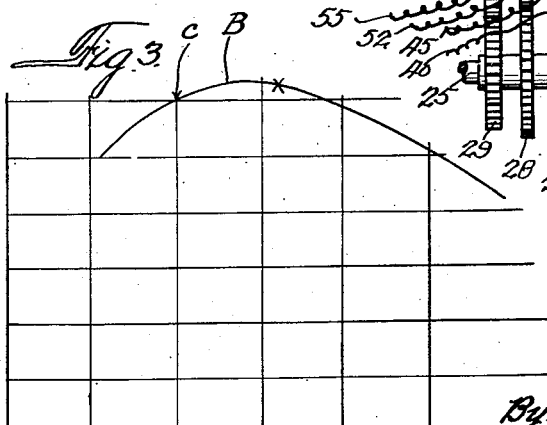
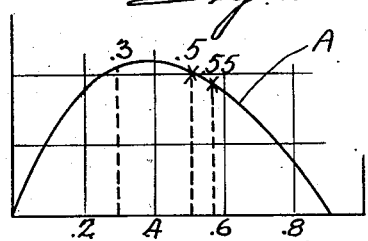
Inventor:
Willard L. Pollard
By Thiess, Olson & Mecklenburger
Attys.

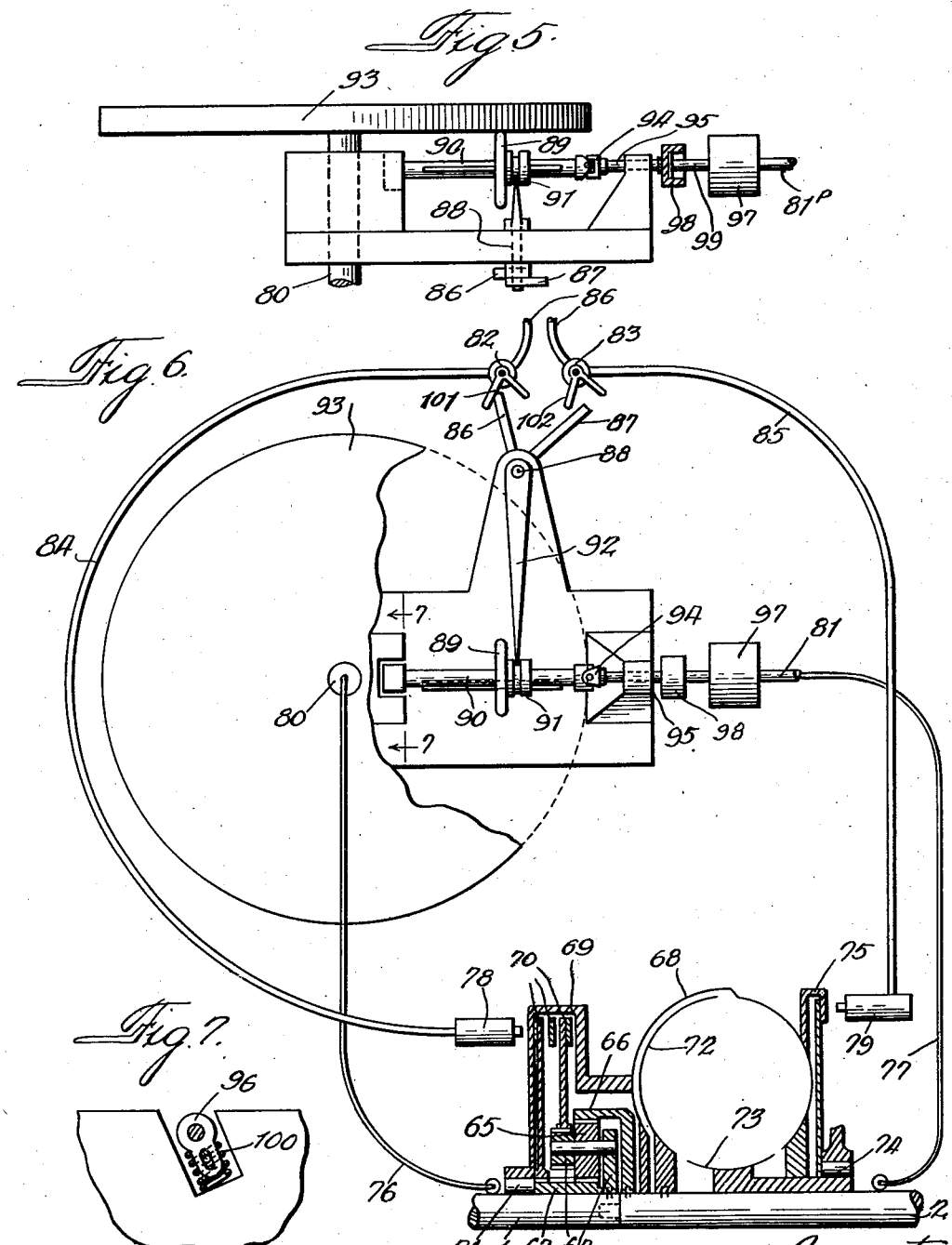

Nov. 24, 1942.  W. L. POLLARD  2,302,714
TRANSMISSION AND CONTROLLER
Filed April 7, 1941  6 Sheets-Sheet 3

Inventor
Willard L. Pollard
By Thiess, Olsen & Mecklenburger
Attys.

Nov. 24, 1942.  W. L. POLLARD  2,302,714
TRANSMISSION AND CONTROLLER
Filed April 7, 1941  6 Sheets-Sheet 4
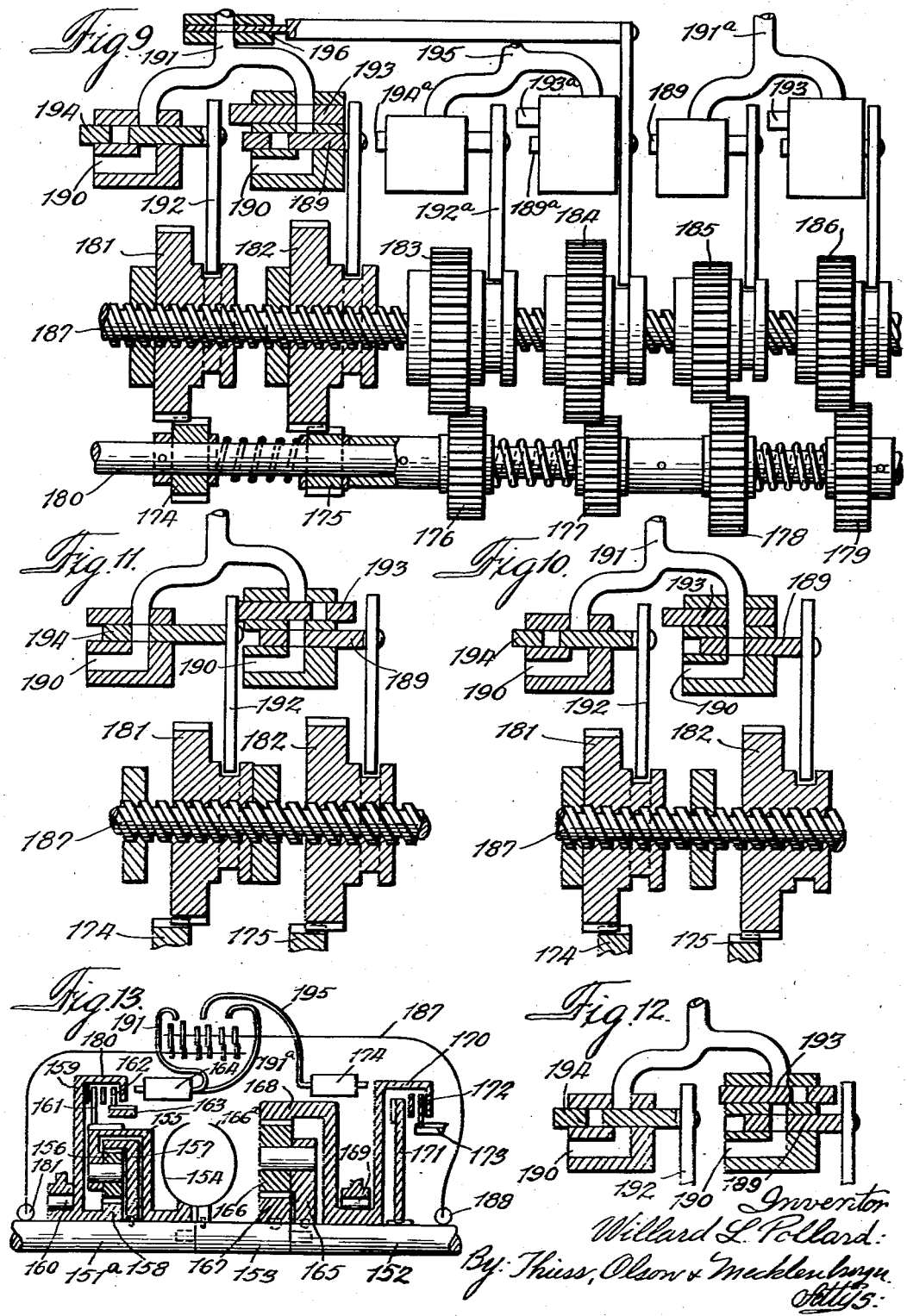

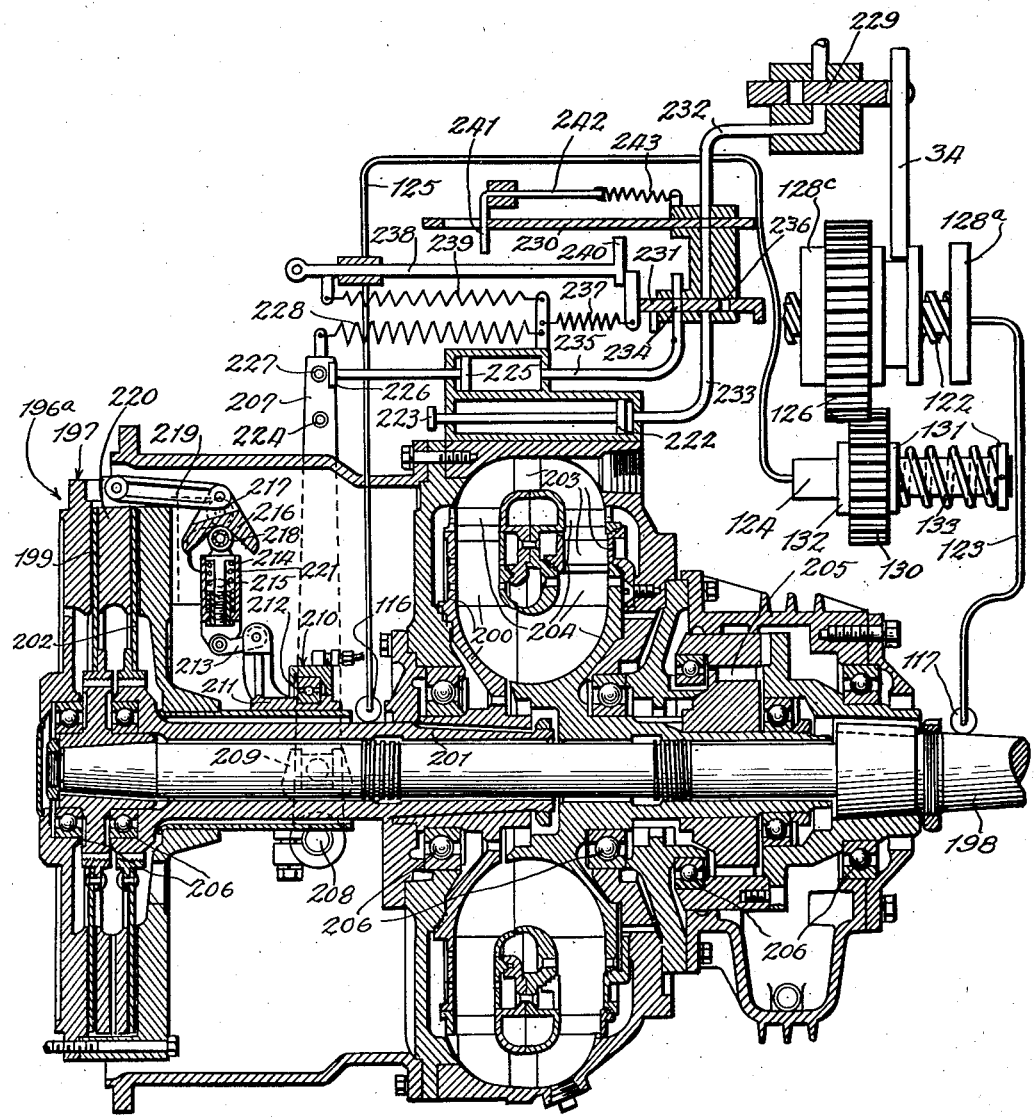

Patented Nov. 24, 1942

2,302,714

UNITED STATES PATENT OFFICE 2,302,714

TRANSMISSION AND CONTROLLER

Willard L. Pollard, Evanston, Ill.

Application April 7, 1941, Serial No. 387,174

8 Claims. (Cl. 74—189.5)

My invention relates to variable lag fluid transmissions and controlling means therefor.

One of the objects of my invention is to provide improved means controlled by the variable lag or lead in a fluid transmission for controlling the selection from a plurality of stages of different relative speed ratios.

A further object of my invention is to provide such a transmission and control in which means are provided for preventing the variable lag from exercising control over a certain speed range.

Further objects and advantages of the invention will appear from the description and claims.

In the drawings, in which my invention is illustrated:

Figure 1 is an axial, sectional view of a variable lag and lead transmission with control means therefor shown diagrammatically;

Fig. 2 is a part-sectional, part-elevational view substantially on the line 2—2 of Fig. 1;

Fig. 3 is a chart showing a typical motor efficiency curve;

Fig. 4 is a typical efficiency curve of a fluid torque converter;

Fig. 5 is a side elevational view showing another form of controller;

Fig. 6 shows a plan view of the construction of Fig. 5, combined diagrammatically with an axial sectional view of a hydro planetary transmission, parts being broken away;

Fig. 7 is a detail sectional view on the line 7—7 of Fig. 6;

Fig. 9 is a side elevational view showing another form of controller, parts being broken away;

Fig. 10 is a sectional view of part of the controller, with the parts in a different position from that shown in Fig. 9;

Fig. 11 is a view similar to Fig. 10, with the parts in still another position;

Fig. 12 is a sectional view showing the parts of Fig. 11 in still another position;

Fig. 13 is an axial sectional view of a transmission controllable by the controller shown in Fig. 9.

Fig. 14 is an axial sectional view showing another form; and

Figure 8:
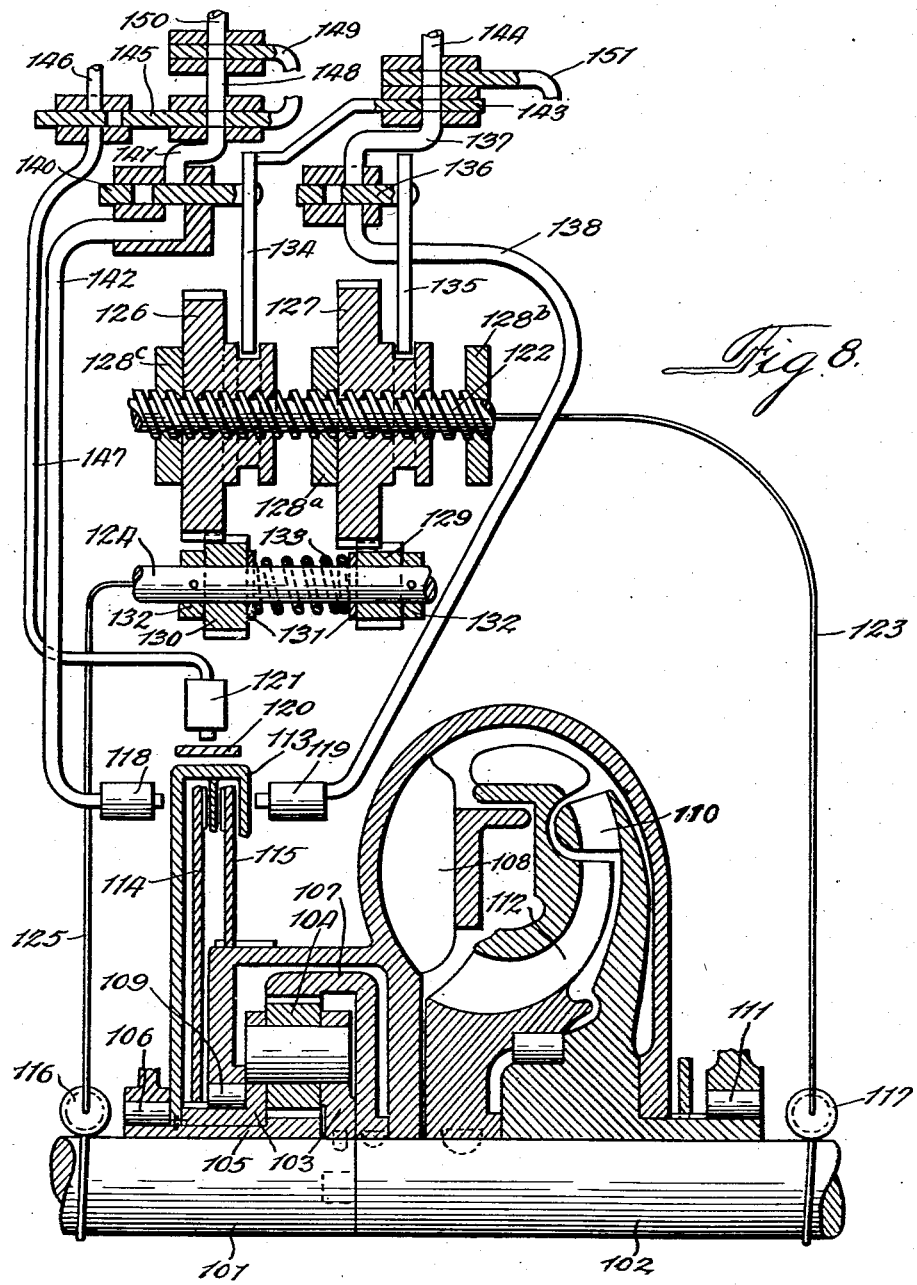
Fig. 8 is a sectional view showing another form of transmission and controller.

Referring to the drawings in detail, and first to Figs. 1–4, inclusive, the construction shown comprises a drive shaft 1, a driven shaft 2, an intermediate shaft 3, a fluid torque converter 4, a clutch 5 for connecting and disconnecting the intermediate shaft 3 with respect to the drive shaft 1, a planetary transmission 6 comprising a ring gear 7 splined to the intermediate shaft 3, a gear carrier 8 splined to the driven shaft 2, a sun gear 9, a planet gearing 10 carried by the gear carrier 8 and meshing with the sun gear 9 and ring gear 8, a one-way coupler or gripper 11 for preventing reverse rotation of the sun gear, a one-way clutch 12 for preventing the sun gear 9 from overrunning the turbine rotor, a clutch 13 for connecting and disconnecting the stato-rotor 14 with respect to the turbine rotor 15, a one-way coupler or anchorage 16 for preventing reverse rotation of the stato-rotor 14, a one-way clutch 17 for preventing the stato-rotor from overrunning the turbine rotor 15, and a pump rotor 18 secured to the drive shaft 1.

Before describing the control means for the transmission, I will briefly describe the operation of the transmission. For high torque ratio, the clutch 19 is conditioned to connect the intermediate shaft 3 and ring gear 7 to rotate with the turbine rotor 15, the other clutches 5, 13, and 20 all being disconnected. In this condition, the one-way anchor 11 holds the sun gear 9 against reverse rotation, and the ring gear 7 is driven from the turbine rotor 15, driving the planet gearing 10, gear carrier 8 and driven shaft 2, the shaft 2 being driven at a lower rate of speed than the ring gear 7. For a higher speed of the driven shaft, the clutch 20 is conditioned to connect the sun gear 9 to rotate with the turbine 15, the clutch 19 remaining connected. Under these conditions, both the sun gear 9 and ring gear 7 are connected to rotate with the turbine rotor 15 so that the driven shaft 2 rotates in unison with the turbine rotor 15. When the drag on the driven shaft 2 becomes small enough with respect to the torque available at the drive shaft 1, a more efficient stage may be used by connecting the clutch 5 and disconnecting the clutch 19. Under these conditions, the power flow is divided, the ring gear 7 being connected direct to the drive shaft 1 and the sun gear 9 being connected to rotate with the turbine rotor 15.

In order to transform the action of the fluid part of the transmission from torque conversion to pure coupling, the clutch 13 is conditioned to connect the stato-rotor 14 direct with the turbine rotor 15.

The apparatus for controlling these various clutches comprises two speedometers and various circuit controllers and circuits controlled by these two speedometers. One of the speedometers is driven from the flexible shaft 21 which in turn is driven from the drive shaft 1, which speedometer controls the angular position of the shaft 22 which carries the contact carrying disc 23. The other of these speedometers is driven from a flexible shaft 24 which in turn is driven from the driven shaft 2, which speedometer controls the angular position of the shaft 25 which carries the four spur gears 26, 27, 28, and 29. The four gears 26, 27, 28, and 29, the angular position of which is controlled by the speedometer shaft 25, mesh with gears 30, 31, 32, and 33, respectively, which are rotatably mounted on the speedometer shaft 22. The hubs of these gears 30, 31, 32, and 33 have mounted thereon contact fingers 34, 35, 36, and 37, respectively, which are engageable and disengageable with respect to the contact plate 38 carried by the disc 23.

A lost-motion connection may be provided, if desired, between the hub of the gear 33 and the contact finger 37, as shown in Fig. 1, and a similar lost-motion arrangement may be provided between the hubs of the gears 32, 31, and 30, and the fingers 36, 35, and 34 carried by these hubs in order to prevent "hunting" action of these fingers when the fingers are close to the edge of the contact plate 38. The gears are so designed that the gear 33 will be rotated at the same angular speed as the shaft 25 which carries the gears 29, 28, 27, and 26. The gear 32 will be rotated at a higher angular velocity than the shaft 25. The gear 31 will be rotated at a higher speed than the gear 32 and the gear 30 will be rotated at a still higher speed than the gear 31. It will be noted that all of the gears 33, 32, 31, and 30 have their angular position controlled by the speed of the driven shaft so that the angular positions of the contact fingers 37, 36, 35, and 34 also will have their angular position determined by the speed of the driven shaft. The angular position of the contact-carrying disc 23 is dependent on the speed of the drive shaft 1, which speed is the same as the speed of the pump rotor 4. The contact fingers and the contact 38 on the disc are so designed and positioned that when the drive shaft 1 and driven shaft 2 are stationary, none of the contact fingers will be in contact with the contact plate. When the drive shaft is caused to rotate, the drag on the driven shaft will cause a lag of the driven shaft with respect to the drive shaft, so that the contact plate 38 will move still farther away from the contact fingers. However, when the conditions are such that the lag of the driven shaft with respect to the drive shaft decreases, the contact fingers will begin to catch up with the contact plate on the disc, due to the speed multiplication effect of the gears. As the lag decreases still further, the contact finger 34 will catch up with the contact plate. In a similar manner, when the lag of the turbine rotor with respect to the pump rotor decreases further, the succeeding contact fingers 35, 36, and 37 will successively catch up with the contact 38 on the disc 23, the gears and speedometers being so designed that this will be accomplished.

I will now describe the circuits by which the contacts and contact fingers control the circuit for the clutches. The electromagnet 39 for the clutch which controls the action of the sun gear 9 with respect to the turbine rotor 15 is connected by a circuit 40 to a contact 41 which is always in engagement with the hub which carries the short contact finger 34. The electromagnet 42 which, when energized, disconnects the clutch 19, is connected through the conductor 43, switch 44, and conductor 45 to a contact 46 which is always in engagement with a contact ring on the hub of the intermediate contact finger 35. The electromagnet 47 which, when energized, connects the intermediate shaft 3 with the drive shaft 1, is connected through the conductor 48, switch 44, and conductor 45 to the same contact finger 35. The electromagnet 49 which, when energized, connects the stato-rotor 14 with the turbine rotor 15, is connected through a conductor 50, switch 51, and conductor 52 to a contact 53 engaging the hub of the intermediate finger 36.

The hub of the other contact finger 37 is engaged by a contact 54 which is connected by the conductor 55 with the electromagnet 56 which, when energized, opens both of the switches 44 and 51. The purpose of this contact finger 37 is to prevent automatically the car from going too fast downhill when the driven shaft 2 becomes the drive shaft, and the drive shaft 1 becomes the driven shaft.

The battery 57 is electrically connected with the fixed wiping contact 58 by means of a conductor 59. This wiping contact 58 engages a small contact plate 60 mounted on the disc 23 and electrically connected with the contact plate 38 by means of rivets 61. The fixed contact 58 and the small movable contact 60 are so placed relative to each other that they will not be in engagement with each other until the motor shaft 1 has attained a speed at which the motor will be operating with a reasonable degree of efficiency.

In operation, with the car standing still and the motor shaft 1 idling but increasing in speed, when the speed of the motor becomes such as to bring the contact 60 in engagement with the fixed contact 58, the contact plate 38 will be energized.

As the driven shaft 2 starts to move and increases in speed, the contact fingers 34, 35, and 36 will be successively brought into engagement with the contact plate 38, and will remain in engagement with this plate until the speed of the driven shaft 2 with respect to drive shaft 1 begins to decrease. It may be assumed that the speedometer gears are so designed that the contact finger 34 will engage the contact plate 38 at a speed ratio of driven shaft 2 with respect to drive shaft 1 of .36; that the contact finger 35 will be brought into engagement with the contact plate 38 when the above speed ratio reaches .55; that the contact finger 36 will be brought into engagement with the contact plate 38 when the above speed ratio reaches .85; and that the contact finger 37 will not be brought in engagement with the contact plate 38 until the speed of the driven shaft 2 exceeds the speed of the drive shaft 1, this latter situation arising when the driven shaft 2 becomes the drive shaft, and the drive shaft 1 becomes the driven shaft, as may happen when going downhill, the accelerator pedal is released, or when coasting to a stop on level roadway.

At the instant the contact finger 34 catches up with the contact plate 38, the overall speed ratio is .36 and the speed ratio of the turbine rotor 15 with respect to the pump rotor 18 is approximately .55. Immediately after the contact finger 34 engages the contact plate 38, the speed ratio of the turbine rotor with respect to the pump rotor will drop materially until the torque ratio increase will be sufficient to equalize the drag.

This equalization may take place at a point where the ratio of turbine speed to pump speed is about .3. If the overall speed ratio continues to increase, the contact finger 35 will catch up to the contact plate 38.

At the instant the contact finger 35 catches up with the contact plate 38, the overall speed is .55 and the speed ratio of the turbine rotor with respect to the pump rotor is also .55.

At the instant the contact finger 36 catches up with the plate 38, the overall speed ratio is .85 but the speed ratio of turbine to pump is still only about .55.

So long as the overall speed ratio remains below .36, the clutch 19 will be connected, and the clutches 5, 13, and 20 will be disconnected. When the speed ratio reaches .36, the contact finger 34 will engage the contact plate 38 and energize the electromagnet 39 to connect the sun gear 9 to rotate with the turbine rotor 15, the sun gear 9 and ring gear 7 being thus both rotatable with the turbine 15. This change in the drive may cause some fluctuation of the speedometer shaft 25 with respect to the speedometer shaft 32, but due to the lost motion connection between the contact finger 34 and the speedometer transmission, the contact 34 will remain in engagement with the contact plate 38, and thus avoid a hunting action of the contact finger.

If the driven shaft 2 continues to pick up in speed with respect to the drive shaft 1, the contact finger 35 will engage the contact plate 38 when the speed ratio becomes .55. At this point the contact finger 35 will engage the contact plate 38 and the electromagnet 47 will be energized to connect the intermediate shaft 3 with the drive shaft 1, and the electromagnet 42 will be energized to release the clutch 19 from connection with the turbine rotor 15. A spring means 60a, acting on the clutch 19 is provided for holding the clutch 19 normally in connecting position with the electromagnets.

With the electromagnets 47 and 42 energized, the intermediate shaft 3 is connected to rotate with the drive shaft 1, and is disconnected from the turbine rotor 15. Under these conditions the sun gear 9 is connected to rotate with the turbine rotor 15 so that a divided power flow is obtained between the drive shaft 1 and the driven shaft 2, resulting in an increase in efficiency, since only part of the power is transmitted through the hydraulic part of the transmission.

If the driven shaft continues to pick up in speed with respect to drive shaft 1, the contact finger 36 will engage the contact plate 38. This will energize the electromagnet 49, causing the clutch 13 to connect the stato-rotor 14 with the turbine rotor 15.

This transforms the hydraulic part of the transmission from a torque converting action to a slip coupling action. This transformation may be made to take place at any desired part of the efficiency curve A of a fluid torque converter shown in Fig. 4.

It will be seen that the points of change at the overall speed ratios of .36, .55, and .85 cause the hydraulic part of the transmission to operate on a relatively high portion of the efficiency curve not extending beyond the ratio of .55 between turbine and pump, thus confining the action of the torque converter in the higher speed ranges to a relatively high efficiency part of the curve. The fixed contact 58 and the movable contact 60 may be so designed as to cause the energization of the contact plate 38 at any desired point on the efficiency curve B of the motor shown in Fig. 3. For example, the apparatus may be so designed that contact will be made at the point C which is about 40% of full motor speed. At this point the motor is operating at relatively high efficiency.

It will be noted that the contact fingers 34, 35, and 36 are not effective to control transmission action below this point C on the motor curve, as the contact 38 is not energized until this point on the motor curve is attained.

If the speed of the driven shaft 2 becomes greater than the speed of the driving shaft 1, as for example in coasting downhill or in coming to a stop on level roadway, the contact finger 37 will engage the contact plate 38. This will energize the electromagnet 46 opening the switches 44 and 51. This will deenergize the electromagnets 47, 49, and 42. This will disconnect the intermediate shaft 3 from the drive shaft 1, disconnect the stato-rotor 14 from the turbine rotor 15, and will allow the spring 60 to cause the clutch 19 to connect the intermediate shaft 3 and ring gear 7 with the turbine rotor 15. This will cause the engine to exert a braking effect in coasting downhill or in coming to a standstill on level roadway.

To effect a reverse, the planet carrier 8 and ring gear 9 are shifted rearwardly. This disconnects the gear carrier from the driven shaft 2 and connects it with the nonrotatable dog clutch ring 62 to hold the gear carrier against rotation. It also disconnects the ring gear 7 from the intermediate shaft 3 and connects it with the dog clutch ring 63 on the driven shaft 2. The planet gears 10 remain in mesh with the sun gear 9. Under these conditions, when the sun gear 9 is driven in one direction, the ring gear 7 will be driven in the reverse direction and will carry with it the driven shaft 2.

The construction shown in Figs. 5–7, incl., comprises a controller and a controlled transmission. The transmission comprises a drive shaft 1, a driven shaft 2, a gear carrier 64 connected to the drive shaft, planet gearing 65 mounted on this gear carrier, a ring gear 66 meshing with the planet gearing and keyed to the driven shaft, a sun gear 67 meshing with the planet gearing, a pump rotor 68, a clutch housing 69 secured to rotate with the pump rotor, a two-way clutch 70 which, in one condition, connects the clutch housing to rotate with the gear carrier 64, and, in another condition, connects the clutch housing to rotate with the sun gear 67, a one-way clutch 71 which prevents the drive shaft 1 from overrunning the clutch housing 69, a turbine rotor 72 keyed to the driven shaft 2, a one-way reaction stato-rotor 73 acting between the pump rotor and turbine rotor, a one-way anchorage device 74 for preventing reverse rotation of the stato-rotor, and a clutch 75 for connecting and disconnecting the pump rotor 68. A speedometer drive 76 is provided, driven from the drive shaft 1, and another speedometer drive 77, driven from the driven shaft. A suitable fluid actuated controller 78 is provided for controlling the two-way clutch 70 and another fluid actuated controller 79 for controlling the rear clutch 75.

When the two-way clutch 70 is positioned to connect the pump rotor 68 with the gear carrier 65, the drive is from the motor shaft 1, through the gear carrier 64, pump rotor 68, stato-rotor 73, and turbine rotor 72 to the controller shaft. When the two-way clutch 70 is positioned to connect the pump rotor 68 with the sun gear 67, the power flow is divided. One path is from the motor shaft 1, through the gear carrier 64, planet gearing 65 and ring gear 66 to the driven shaft 2. The other path is from the drive shaft 1, through the gear carrier, planet gearing, sun gear, pump rotor, stato-rotor, and turbine rotor to the driven shaft. In this position the torque multiplication is less than in the first position, but an increase in efficiency results, since only a fraction of the power goes through the hydraulic part of the transmission.

When the clutch 75 is operated to connect the stato-rotor with the pump rotor, the hydraulic part of the transmission ceases to act as a hydraulic torque converter and begins to operate as a hydraulic coupler.

The controller device for the transmission comprises a shaft 80 driven from the front speedometer shaft 76, another shaft 81 driven from the rear speedometer shaft 77, a valve 82 for controlling the front fluid pressure actuator 78, and a valve 83 for controlling the rear fluid pressure actuator 79. The valve 82 is connected with the actuator 78 by means of a suitable tube or pipe 84, and the other valve 83 is connected with the other actuator 79 by means of another tube 85. Fluid under pressure is supplied to these valves by means of the tubes 86. The two valves 82 and 83 are controlled by means of a pair of arms 86 and 87, respectively, mounted on a rock shaft 88, the movement of which is controlled by the relative speed of the drive shaft 1 and driven shaft 2. The means for controlling this rock shaft 88 comprises a friction wheel 89 splined on a shaft 90 driven from the rear speedometer shaft 77 having a grooved shifting collar 91 which engages the swinging end of the rock arm 92 on the rock shaft 88, which wheel 89 adjusts itself automatically along the face of the friction disc 93 and assumes a position which is a function of the relative speed of the two speedometer shafts 76 and 77. To enable the self-adjusting action, the shaft 90 on which the friction wheel 89 is splined has a universal joint connection 94 with the shaft 95, which is driven from the rear speedometer shaft 77, and the end of the shaft remote from this universal joint is floatably mounted in a floating bearing 96 (Fig. 7), which enables the shaft to have a limited swinging movement under the face of the disc 93 which is driven from the front speedometer shaft 76. To secure the desired speed of the shaft 95, a suitable gear box 97 may be provided. A one-way clutch 98 is provided between the shaft 95 and the output shaft 99 for a purpose which will appear hereinafter. A coil compression spring 100 (Fig. 7) is provided for pressing the floating bearing 96 toward the face of the friction disc 93. It may be assumed that the parts are arranged so that the disc 93 rotates in a clockwise direction, as seen in Fig. 6, and that when the friction wheel 89 rotates in a counterclockwise direction, as seen from the right in Fig. 5, the one-way clutch 98 will permit only counterclockwise motion to the shaft 90, and that the gear box 97 is of such ratio that when the speed ratio of the drive shaft 1 and driven shaft 2 is 1:1, the peripheral speed of the friction wheel 89 will be equal to the surface speed of the friction disc 93 near its periphery.

In operation, the wheel 89 will shift to and fro on the splined shaft 90 in such a way that it will contact the friction disc 93 at a point where the surface speed of the friction disc 93 is equal to the peripheral speed of the friction wheel 89.

The reason for this is that if the peripheral speed of the wheel 89 is greater than the surface speed of the disc 93, the shaft 90 will be tilted in a clockwise direction, as seen in Fig. 6, about the universal joint 94 so that the wheel 89 will tend to crawl outwardly with respect to the friction disc, and vice versa, if the peripheral speed of the friction wheel 89 is less than the surface speed of the friction disc 93, the spring 100 will exert its horizontal component of force to tilt the shaft 90 counterclockwise and cause the friction wheel 89 to crawl inwardly.

The one-way clutch 98 is provided in order to allow the driven shaft 2 to remain stationary while the motor shaft 1 still rotates, in which case the friction wheel 89 will shift to the left to a point near the center of the friction disc 93 and in that position will be driven to overrun the shaft 99 without grinding against the disc 93.

In operation, if the shaft 2 is initially standing still, the friction wheel 89 will be close to the axis of the friction disc 93. As the shaft 2 picks up in speed with respect to the motor shaft 1, the friction wheel 89 will crawl to the right, as seen in Fig. 6. This will move the rock arm 92 in a counterclockwise direction. This will first cause the arm 86 and valve lever 101 to operate the valve 82 to supply fluid to the actuator 78 to disconnect the pump rotor 68 from the gear carrier 64 and connect it with the sun gear 67. As previously explained, this will result in a decrease in the maximum torque available but will also result in an increase in efficiency.

If the speed of the driven shaft 2 with respect to the drive shaft 1 continues to increase, the friction wheel 89 will move still further to the right, as seen in Fig. 6, and will cause the arm to engage the valve lever 102 and supply fluid to the actuator 79 to cause the clutch 75 to connect the stato-rotor 73 to rotate with the pump rotor 68. When this takes place, the hydraulic part of the transmission will cease to act as a hydraulic torque converter and will begin to act as a hydraulic coupler. It will be seen that by choosing the relative dimensions of the controller, the changes from high torque to low torque drive and from hydraulic converter action to hydraulic coupler action may be made to take place at any desired relative speed of the driven shaft with respect to the drive shaft, and hence at any desired point on the efficiency curve of the hydraulic part of the transmission.

The construction in Fig. 8 comprises a turbo-planetary transmission and control apparatus therefor. The turbo-planetary transmission comprises a drive shaft 101, a driven shaft 102, a gear carrier 103 keyed to the drive shaft, planet gearing 104 carried by the gear carrier, a sun gear 105 meshing with the planet gearing, a one-way anchor 106 for preventing reverse rotation of the sun gear, a ring gear 107 meshing with the planet gearing and keyed to the driven shaft 102, a pump rotor 108, a one-way clutch 109 for preventing the gear carrier from over-running the pump rotor, a reactance stator 110, a one-way anchor 111 for preventing reverse rotation of the stator, a turbine rotor 112 keyed to the driven shaft, clutch mechanism comprising a clutch casing 113 keyed to the sun gear, a clutch plate 114 for connecting and disconnecting the gear carrier with respect to the clutch casing, and a clutch plate 115 for connecting and disconnecting the pump rotor with respect to the clutch casing, a speedometer gear 116 driven from the drive shaft, a speedometer gear 117 driven from the driven shaft, a hydraulic actuator 118 for controlling the action of the clutch plate 114, a hydraulic actuator 119 for controlling the action of the clutch plate 115, a brake 120 for holding the clutch casing against rotation, and a hydraulic actuator 121 for controlling this brake.

The control mechanism includes a rotatable screw-threaded shaft 122 driven from the speedometer shaft 123, a shaft 124 driven from the other speedometer shaft 125, a pair of internally threaded spur gears 126 and 127 threaded on the threaded shaft, collars 128a, 128b, and 128c fast on the shaft 122 for limiting the spiral movement of the spur gears 126 and 127 on the screw-threaded shaft, frictionally driven spur pinions 129 and 130 mounted on the shaft 124, friction washers 131 splined on this shaft 124 engaging the sides of the gears 129 and 130, collars 132 fast on the shaft 124 to prevent endwise slip of the pinions 129 and 130, a coil compression spring 133 urging the friction washers 131 against the sides of the gears and valve mechanism controlled by the axial component of the spiral movement of the gears for controlling the action of the fluid pressure actuator.

This valve mechanism is controlled by the shifter arms 134 and 135 engageable with annular grooves in the gears 126 and 127, respectively. The valve mechanism controlled by the right-hand gear 127 comprises a valve 136 to which the shifter arm 135 is secured, controlling the flow from the tube 137 to the tube 138 leading to the actuator 119. The valve mechanism controlled by the left-hand gear 126 comprises valve 140 controlling the flow from the tube 141 to the tube 142 leading to the actuator 118, and a valve 143 controlling the flow from the tube 144 to the tube 137. It will be noted that the valve 143 is in series flow relation with respect to the valve 136.

The control valve mechanism further includes a duplex valve 145, one portion of which controls the flow from the pressure supply tube 146 to the tube 147 leading to the actuator 121 and the other portion of which controls the flow from the tube 148 to the tube 141. This valve 145 may be manually controlled or may be controlled by abnormal movements of the accelerator pedal. The valve mechanism also includes a valve 149 for controlling the flow from the pressure supply tube 150 to the tube 148, which valve 149 is in series flow relation with the right-hand portion of the manually-controlled valve 145 and also in series flow relation with respect to the gear-controlled valve 140. This valve 149 may be controlled in any suitable manner as by motor speed which may be the speed of the shaft 101. The control valve mechanism also includes a valve 151 controlling the flow between the pressure supply tube 144 and the tube 137 which also may be controlled by the speed of the shaft 101 and which valve is in series flow relation with respect to the valve 143 and the valve 136.

The transmission may operate under four different conditions as follows: (1) high torque condition, in which both clutch plates 114 and 115 are free and the brake 120 is free; (2) efficient torque converter action, in which the clutch plate 115 is connected, the clutch plate 114 and the brake 120 being still disconnected; (3) direct drive, in which the clutch plate 114 is connected, the brake 120 being still disconnected and it being immaterial whether or not the clutch plate 115 is connected; (4) overdrive, in which the brake 120 is applied and the clutch plates 114 and 115 are disconnected.

In the first of the above four conditions, the drive is from the drive shaft 101, through the gear carrier 103, one-way clutch 109, pump rotor 108, stator 116 and turbine rotor 112 to the driven shaft 102. In the second of the above conditions, there is a divided flow of power between the shafts 101 and 102, one path being from the gear carrier 103, through the planet gearing 104 and ring gear 107 to the driven shaft 102, and the other path being from the gear carrier 103, through the sun gear 105, clutch housing 113, clutch plate 115, pump rotor 108, stator 116 and turbine rotor 112 to the driven shaft 102. In the third condition, there is direct drive, since the sun gear 105 is directly connected with the gear carrier 103 through the clutch housing 113 and clutch plate 114. In the fourth condition, there is a gear overdrive as the sun gear is held against rotation by the brake 120 and the ring gear will be driven at a higher rate of speed than the gear carrier 103.

The gears 127 and 129 have their pitch diameters so proportioned that at a certain definite speed ratio of driven shaft 102 with respect to drive shaft 101, the roles of driving member and driven member with respect to the gears 127 and 129 will be reversed. For example, the pitch diameters of the two gears 127 and 129 may be so designed that below a speed ratio of .6 of driven shaft 102 with respect to drive shaft 101, the gear 129 will be exerting a driving force or pull on the gear 127 which will hold this gear 127 against stop collar 128a, the gear 129 slipping on the shaft 124 by reason of the slip friction drive exerted by the friction discs 131 and 132. When, however, the speed of the driven shaft 102 with respect to the drive shaft 101 rises above the ratio .6, the gear 127 will try to run ahead of the gear 129, but as the gear 129 will then exert a drag on the gear 127, the gear 127 will travel in a spiral path along the threads of the shaft 122 until the gear comes into engagement with the stop shoulder 128b. Thereafter the gear 129 will again slip on the shaft 124, due to the slip drive of the friction discs 131 and 132. When the gear 127 moves as above described from engagement with the stop collar 128a into engagement with the stop collar 128b, it will act on the shifter arm 135 to move the valve 136 from closed to open position. This shift will take place at a speed ratio of turbine to pump of .6 where the efficiency of the converter may have fallen to about 80%.

In a similar manner, the pitch diameters of the gears 128 and 130 may be so designed that with a definite speed ratio of driven shaft 102 with respect to drive shaft 101, the gear 126 will be shifted from its left-hand position where it engages the stop collar 128c to the right-hand position in which it engages the stop collar 128a. This lateral shift of the gear 126 will act on the shifter arm 134 to move the valve 140 from closed to open position and also to move the valve 143 from open to closed position. The point chosen in the speed ratio scale of driven shaft 102 to driving shaft 101 for this shifting of the gear 126 may be about .82, at which time the speed ratio of turbine to pump will again be about .6.

As previously indicated, the valves 149 and 151 may be controlled by the speed of the motor. For example, the valve 151 may be controlled so that it will remain closed until the speed of the motor reaches, for example, 900 R. P. M., after which it will remain open. The valve 149 may be so controlled that it will remain closed until the speed of the motor reaches, for example, 1200 R. P. M., after which it will remain open. The valve 145 may be manually controlled and may be made to occupy any one of three different positions. In its intermediate position, it provides communication between the tubes 148 and 141. In its left-hand position, it closes communication between the tubes 148 and 141 and opens communication between the tubes 146 and 147. In its right-hand position, it closes communication between the tubes 148 and 141 and also closes communication between the tubes 146 and 147.

Since the valve 151 is in series with the valve 136, it follows that the valve 136 cannot open communication between the pressure supply tube 144 and the tube 138 until the motor speed has reached 900 R. P. M. This prevents a shift to higher gear ratio until the motor is working on an efficient part of its efficiency speed curve. Also, since the valve 149 is in series with the valve 140, it will prevent the valve 140 from opening communication between the pressure supply tube 150 and the tube 142 until the motor speed has reached 1200 R. P. M. where it will still be working on an efficient part of the motor efficiency speed curve. If desired, the valves 149 and 151 may be omitted, together with their function. The valves 140 and 143 are interconnected so that, when one valve is opened, the other is closed.

In operation, if it is assumed that the shaft 102 is initially stationary and that the drag of the shaft 102 is such that the turbine rotor 112 will pick up in speed with respect to the pump rotor 103, it will come to pass that the speed of the shaft 102 with respect to the shaft 101 will become equal to and greater than .6. At this point, the gear 129 will cease to pull on the gear 127 and will begin to drag. This will cause the gear 127 to thread itself along the shaft 122 and move from its left-hand position to its right-hand position. This will open the valve 136. If, in the meantime, the speed of the motor shaft 101 has become greater than 900 R. P. M., the valve 151 also will be open. This will admit fluid under pressure to the actuator 119 which will connect the clutch plate 115 with the clutch housing 113, thus connecting the pump rotor 108 with the sun gear 105. This will change the transmission condition from the first condition described to the second condition, in which there is a divided flow of power between the shaft 101 and 102, approximately two-thirds going through the ring gear 107 and the other third going through the sun gear 105 and the hydraulic part of the transmission. This change in condition of the transmission will at first cause a considerable drop in the speed ratio of the turbine rotor 112 with respect to the pump rotor 108 which will cause the hydraulic part of the transmission to begin operating on a different point of its efficiency curve from the point on which it had been previously operating. This point on the efficiency curve may be a point which corresponds approximately with a speed ratio of the driven shaft with respect to the drive shaft of .4. It will be noted that this is still a high point on the efficiency curve of the torque converter. If the drag of the drive shaft 102 is such that it will again start to catch up in speed with the pump rotor 108, the speedometer shaft 123 will continue to catch up in speed with respect to the speedometer shaft 125 and will eventually reach a condition in which the pinion 130 will cease to exert a pull on the gear 126 and will exert a drag. The pitch diameter of the gears 126 and 130 may be so designed that this change from pull to drag will take place at a speed ratio of driven shaft with respect to drive shaft of .82. This will correspond to an efficiency on the part of the hydraulic portion of the transmission of approximately .8. When this change from pull to drag of the pinion 130 takes place, it will cause the gear 126 to shift laterally as described above and will open the valve 140 and close the valve 143. If the speed of the motor shaft 101 has by this time reached 1,200 R. P. M., the valve 149 will be open. The opening of the valves 140 and 149 will connect the actuator 118 with the fluid pressure 150 and will connect the clutch plate 114 with the clutch housing 113. It will be noted that the shift to the right of the shifter arm 134 has closed the valve 143 so that the actuator 119 is no longer activated. The above condition will free the clutch plate 115 and connect the clutch plate 114 to the clutch housing 113, thus causing a direct drive between the shaft 101 and 102 as above described. The valve 145 described above may be operated manually or by abnormal movement of the auxiliary pedal. Its use is to superimpose a manual control. For overdrive, this valve 145 is shifted to the left. This will cut off the actuator 118 from its source of supply and will connect the actuator 121 with its source of supply. This will cause the release of the clutch plate 114 and the application of the brake 120 to effect overdrive. If the valve 145 is shifted to the right, it will cut off the actuator 118 as well as the actuator 121 from its pressure supply. This will cancel both the overdrive and direct and will place the transmission again under the control of the valves 140 and 136.

In Figs. 9–13, incl., is shown a four-stage hydraulic planetary combination in which the hydraulic part is in the form of a coupler, as distinguished from a torque converter. In dealing with a hydraulic coupler, as distinguished from a converter, the difference between the slip torque curve of a coupler and the slip torque curve of the converter has to be considered. In a coupler, at high speeds of both pump and turbine, the torque increases rapidly with the slip.

The transmission part of the apparatus, as shown, comprises a drive shaft 151a, a driven shaft 152, an intermediate shaft 153, a pump rotor 154, a gear carrier 155 rotatable with the pump rotor, planet gearing 156 mounted on the gear carrier, a ring gear 157 meshing with the planet gearing and keyed to the drive shaft 151, a sun gear 158 meshing with the planet gearing, a clutch housing 159 rotatable with the sun gear, a one-way anchor 160 for preventing reverse rotation of the sun gear, a clutch plate 161 splined to the gear carrier and connectible and disconnectible with respect to the clutch housing 159, an anchor plate 162 splined on a fixed anchor ring 163 and connectible and disconnectible with respect to the clutch housing, a fluid pressure actuator 164 which, when supplied with fluid, connects the clutch plate 161 with the clutch housing 159 and which, when not supplied with fluid, connects the clutch housing to the anchor plate 162, a gear carrier 165 keyed to the driven shaft 152, planet gearing 166 mounted on the gear carrier, a turbine rotor 166a, a sun gear 167 keyed to the intermediate shaft 153, a ring gear 168 meshing with the planet gearing, a one-way anchor 169 for preventing reverse rotation of the ring gear, a clutch housing 170 rotatable with the ring gear 168, a clutch plate 171 splined on the driven shaft 152 and connectible and disconnectible with respect to the clutch housing 170, an anchor plate 172 splined on the fixed anchor ring 173 and connectible and disconnectible with respect to the clutch housing 170, and a fluid pressure actuator 174 which, when supplied with fluid pressure, connects the clutch plate 171 with the clutch housing 170 and which, when not supplied with fluid pressure, causes the anchor plate 172 to be connected with the clutch housing.

This construction enables four different gear speed ratios to be obtained. For low gear, fluid is not supplied to either of the actuators 164 and 174 and hence both anchor rings 163 and 173 are connected to the clutch housings 159 and 170, respectively. In this condition, the ring gear 168 is held against rotation and the sun gear 158 is held against rotation. The power flow is from the drive shaft 151a through the ring gear 157, planet gear 156, gear carrier 155, pump rotor 154, turbine rotor 166a, intermediate shaft 153, sun gear 167, planet gearing 166, and gear carrier 165 to the driven shaft 152.

The front planetary may be designed to give a speed reduction of .7 and the rear planetary may be designed to give a speed reduction of .4. The combined reduction will amount to .28. For the next higher gear, fluid pressure is supplied to the front actuator 164 which will connect the sun gear 158 and gear carrier 155 to rotate as a unit with the ring gear 157. This will cause the front planetary to rotate as a unit and will give an overall speed reduction of .4. For the next higher stage, fluid is cut off from the front actuator 164 and is supplied to the rear actuator 174. This will cause the rear planetary to rotate as a unit and will result in an overall speed reduction of .7. For direct drive, fluid pressure is supplied to both actuators 164 and 174, causing both planetaries to rotate as units.

The control mechanism for the transmission comprises three sets of four gears each, each set being similar in general to the four gears shown in Fig. 8. The friction driven gears 174, 175, 176, 177, 178, and 179 are mounted on a shaft 180 driven from the front speedometer drive 181 and the internally threaded gears 181, 182, 183, 184, 185, and 186 are mounted on a threaded shaft 187 driven from the rear speedometer drive 188. The pitch diameters of the gears 175 and 182 are so designed that the action of the friction driven gear 175 will change from a pull to a drag at a point where there is approximately 2½ per cent slip between the pump rotor 154 and the turbine rotor 166a. This will cause the gear 182 to shift to the right, as shown in Fig. 10, and open the valve 189 to supply fluid under pressure from the pressure inlet 190 to a pipe 191 leading to the left-hand actuator 164. This will cause the actuator 164 to connect the sun gear 158 to rotate with the gear carrier 155 and will step up the gear part of the transmission from a .24 ratio to a .4 ratio. This will result in a temporary slowing down of the turbine rotor 166a with respect to the pump rotor, but the turbine rotor will begin to catch up with the pump rotor.

The pitch diameters of the gears 174 and 181 are so designed that under the latest assumed condition of the gear part of the transmission (that is to say, the drive immediately above low), the action of the friction driven gear 174 will change from a pull to a drag at a point where the slip of the turbine with respect to the pump is approximately 2½ per cent. When the slip of the turbine becomes less than 2½ per cent., the gear 181 will move to the right, as shown in Fig. 11, the shifter arm 192 engaging and closing the valve 193, which is in series with the previously opened valve 189, but opening another valve 194 which will continue to cause pressure to be supplied from the pressure supply 190 to the actuator 164. The purpose of this valve 194 is to enable the controller to return the transmission to low gear if the slip should again become more than 2½ per cent. If the slip should become more than 2½ per cent., the gear 181 will shift back to the left, leaving the valve 193 as shown in Fig. 12, closing the valve 194, cutting off pressure from the actuator 164, disconnecting the clutch plate 161, and connecting the anchor plate 162, to return the transmission to low gear. If, instead of the above suggested increase in slip to more than 2½ per cent., the slip should decrease to 1¼ per cent., the gear 184 will shift to the right, admitting fluid under pressure to the pipe 195.

The shifting of the gear 184 to the right shifts the valve 189a to supply pressure to the tube 195 which leads to the right-hand actuator 174 and also closes the valve 196 to cut off pressure from the actuator 164. This connects the clutch plate 171 with the clutch housing 170 and connects the clutch housing 159 with the anchor plate 162. Under these conditions the rear planetary rotates as a unit and the overall gear ratio is .7. This change in the overall gear ratio will result in a temporary slowing down of the turbine rotor with respect to the pump rotor but the turbine rotor will start to catch up with the pump rotor.

The pitch diameters of the gears 176 and 183 are so designed that under the above condition of the gear part of the transmission (that is to say, the drive immediately below direct drive), the action of the friction driven gear 176 will change from a pull to a drag at a point where the slip of the turbine with respect to the pump is 3 per cent. When the slip of the turbine becomes less than 3 per cent., the gear 183 will move to the right, the shifter arm 192a engaging and closing the valve 193a which is in series with the previously opened valve 189a but opening another valve 194a which will continue to cause pressure to be applied to the tube 195 and the actuator 174. The purpose of this valve 194a is to enable the controller to return the transmission from the next-to-high stage to the next-to-low stage if the slip should again become more than 3 per cent. If, however, the slip should continue to decrease so as to become less than 1½ per cent., the gear 186 will shift to the right, supplying pressure to the tube 191a which is in parallel with the tube 191 and, like it, supplies pressure to the actuator 164. The gears 178 and 185, operating in a manner similar to the pair of gears 174 and 181, serve to change the transmission from direct drive to the next stage below direct drive if the slip should become more than 1½ per cent.

The construction shown in Fig. 14 comprises a duplex clutch 196a, the driving member 197 of which may be driven from a motor, a driven shaft 198 to which one of the driven clutch discs 199 is secured, and a hydraulic torque converter comprising a pump rotor 200 mounted on a sleeve 201 to which the other driven clutch disc 202 is secured, a stator 203, and a turbine rotor 204 having a one-way clutch connection 205 with the driven shaft. The construction is such that with the duplex clutch 196a in one condition the drive is from the driving clutch member 197, through the driven clutch disc 202, sleeve 201, pump rotor 200, stator 203, turbine rotor 204, and one-way clutch 205 to the driven shaft 198, the other driven clutch disc 199 being disconnected, and such that in the other condition of the duplex clutch the driven clutch disc 202 is disconnected to eliminate the action of the hydraulic part of the transmission, and the other clutch disc 199 is connected to drive the driven shaft 198 direct from the driving clutch member. Suitable antifriction bearings 206 are provided.

For controlling the action of the duplex clutch, a rock lever 207 is provided mounted on a rock shaft 208. The transmission from this rock shaft to the clutch comprises a rock yoke 209 secured to the rock shaft 208, an axially movable shifting yoke having a pivoted and sliding connection with the shifter yoke 210, a shifter ring 211 rotatable with the clutch 196a and having a ball bearing swivel connection 212 with the shifter yoke 210, a plurality of links 213 pivotally mounted on the shifter ring, a plurality of rockers 214 pivotally mounted at 215 on the clutch, a plurality of bifurcated rockers 216 pivotally mounted at 217 on the clutch and engageable by rollers 218 on the rockers, and a plurality of links 219 pivotally connecting the bifurcated rockers 217 with the shiftable pressure plate 220 which lies between the two driven clutch discs 199 and 202.

When the yoke 210 is shifted to the right, the lower end of the rocker 214 is moved to the right, the antifriction roller 218 on the upper end of the rocker is moved to the left, and the upper end of the bifurcated rocker 217 is moved to the right, thus moving the link 219 and pressure plate 220 to the right to grip the driven friction disc 202 between the pressure plate 220 and the right-hand side of the driving clutch member 197. When the shifting yoke 210 is moved to the left, the lower end of the rocker 214 is moved to the left, the antifriction roller 218 is moved to the right and the upper end of the bifurcated rocker 217 is moved to the left, pushing the pressure plate 220 to the left to release the right-hand clutch disc 202 and to grip the left-hand clutch disc 199 between the pressure plate and the left-hand side of the driving clutch member. In order to effect a yielding spring-pressed engagement of the pressure plate on the clutch disc, the antifriction rollers 218 are mounted on plungers which are spring-pressed upwardly by means of coil compression springs 221.

For controlling the shifting lever, a pair of pressure-controlled cylinders and pistons are provided, the lower piston 222 having a plunger head 223 engageable with an antifriction roller 224 on the lever 207 and the upper piston 225 having a pressure head 226 engageable with another antifriction roller 227 on the lever. A coil tension spring 228 is provided, tending to hold the lever 207 in its right-hand position. The lower longer cylinder is controlled primarily by a valve 229, the position of which is determined by the relative speed between the pump rotor and the turbine rotor. The apparatus by which the position of the valve is controlled is similar to that shown in Fig. 8, comprising the shaft 122 driven by means of the speedometer drive 117 and shaft 123, the stop collars 128a and 128c for limiting the helical movement of the gear 126 on the helical shaft 122, the shaft 124 driven from the pump rotor sleeve 201 by means of the speedometer drive 118 and shaft 125, the gear 130 meshing with the gear 126, the friction collar 132, the washers 131, the coil compression spring 133, and the shifter arm 134 connected with the valve 229.

Assuming that the valves 230 and 231 are in position to connect the tubes 232 and 233, the operation of the valve shifting gears 126 and 130 is substantially the same as that described in connection with Fig. 8. When the speed ratio of the driven shaft 198 with respect to the pump rotor 200 reaches a predetermined value, the gear 130 will cease to exert a pull on the gear 126 and will begin to exert a drag. This will cause a helical motion of the gear 126 on its shaft 122 and will cause it to thread to the right until it engages the stop collar 128a. This shift of the gear 126 to the right opens the valve 229, admitting pressure to the pipe 233 leading to the long cylinder. This will force the lever 207 to its extreme left-hand position, thus shifting the yoke 210 to its extreme left-hand position, causing the upper end of the antifriction roller 218 to move to its extreme right-hand position and force the pressure plate 220 to its extreme left-hand position, releasing the clutch plate 202 connected with the pump rotor and connecting the clutch plate 199 secured to the driven shaft 198. Thus, at a definite point in the changing speed ratio of driven shaft with respect to pump rotor, the hydraulic part of the transmission will be disconnected and the driven shaft will be connected direct with the driving member of the clutch. By this apparatus the inefficient portion of the efficiency curve of the hydraulic torque converter may be eliminated.

The lower one of the auxiliary control valves 231 is provided in order to return the control lever to the neutral position shown in the drawings when the accelerator pedal is released. To accomplish this, the valve 231 is provided with a port 234 which, when the valve is in its right-hand position, will connect a pressure supply pipe with the pipe 235 leading to the upper cylinder and is also provided with a port 236 which, when the valve is in its left-hand position, will connect the pressure passage 232 with a tube 233 leading to the lower cylinder. A coil tension spring 237 is provided which tends to hold the valve in its left-hand position. This valve 231 is controlled by means of slide rod 238 which is directly connected with the accelerator pedal. When the accelerator pedal is released, the pedal spring 239 will cause the slide rod 238 to move to its extreme right-hand position, which will close the port 236 and open the port 234. This will supply pressure to the piston 225 and cause the plunger 226 to move the lever 207 to neutral position, in which the pressure plate 220 will be in its central position, leaving both clutch discs disconnected. As soon as pressure is applied to move the accelerator pedal to the left, the slide rod 238 connected with it will be moved to the left, allowing the spring 237 to move the valve 231 to its left-hand position, in which the port 234 will be closed and the port 236 will be open to connect the pressure passage 232 with the tube 233 leading to the lower cylinder. Then, if the valve 230 is open, pressure will be supplied from the pressure line 232 to the lower cylinder as soon as the valve 229 has been moved to the right by the helical movement of the gear 126. The upper valve 230 is provided to enable the operator to shift from direct drive to hydraulic drive when desired, by an abnormal movement of the accelerator pedal. This abnormal movement will move the slide rod 238 to a position in which its pressure head 240 will engage a pressure head 241 an another slide rod 242, which auxiliary slide rod has a lost motion connection with the valve 230. This excess or abnormal movement of the slide rod will close the valve 230, cutting off the supply of pressure to the lower cylinder and enabling the coil tension spring 228 to return the control lever 207 to its right-hand position, in which the hydraulic part of the transmission will be brought into play. This slight normal leakage past the pistons 222 and 225 and at the valve 231 will in general enable fluid to escape to enable the pistons to return under the action of the spring 228. This condition will be maintained at least until the accelerator pedal is released sufficiently to enable the spring 243 to cause the auxiliary slide rod 242 to move to the right to take up the lost motion in its connection with the valve and finally to open this valve. This will place the transmission again in condition for control by means of the gears 126 and 130. It should be stated that the transmission and clutch are shown approximately to one-fourth scale, while the gears and valves are shown approximately in full scale.

Figure 15:
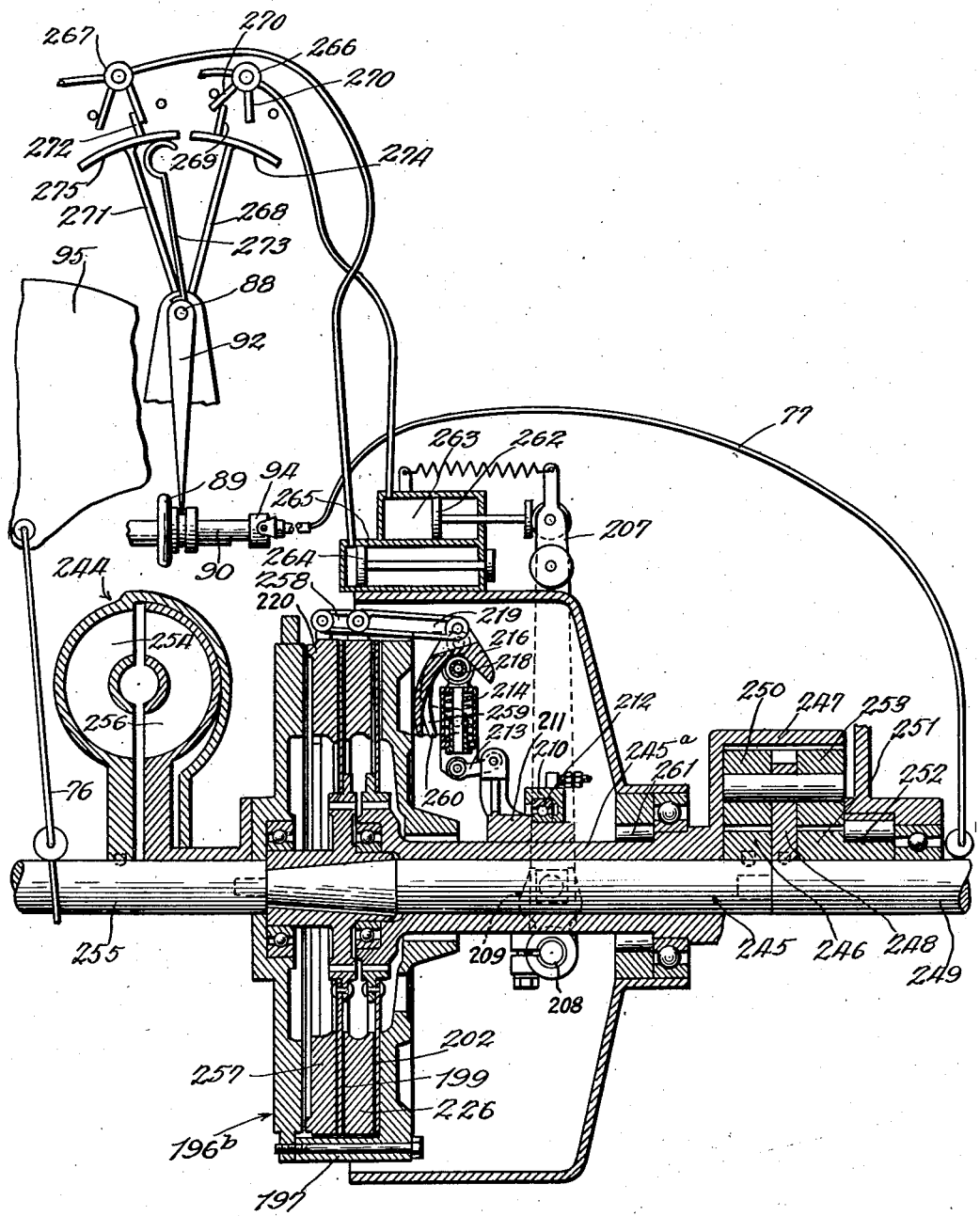
Fig. 15 is an axial sectional view showing another form.

The construction shown in Fig. 15 comprises a duplex clutch 196b, similar to the duplex clutch 196a shown in Fig. 14, having a driving member 197, which may be driven from a hydraulic coupler 244, an intermediate shaft 245 to which one of the clutch discs 199 is secured, a second driven clutch disc 202 splined on the sleeve 245a, a planetary gear construction comprising a sun gear 246 keyed on the shaft, a ring gear 247 fast on the sleeve 245a, a gear carrier 248 keyed to the driven shaft 249, planet gearing 250 mounted on the gear carrier 248 and meeting with the sun gear 246 and ring gear 247, a second sun gear 251 held against reverse rotation by means of the one-way anchor 252, a second set of planet gearing 253 meshing with the sun gear 251 and ring gear 247, and control apparatus for the clutches similar to the control apparatus shown in Fig. 6 comprising the friction wheel 89, the shaft 90 having a universal joint connection 94, on which the friction wheel 89 is splined, the friction disc 95, the rock arm 92 shifted by the friction wheel 89, and the rock shaft 88. The friction disc 95 is driven from the front speedometer drive shaft 76 and the friction wheel 89 is driven from the rear speedometer drive shaft 77.

The hydraulic coupling 244 comprises the pump rotor 254 keyed to the motor shaft 255 and the turbine rotor 256 fixed to the driving member 197 of the clutch.

The duplex clutch 196b differs from the duplex clutch shown in Fig. 14 in that it includes means whereby both clutch plates 199 and 202 may be simultaneously connected to rotate with the driving clutch member 197 under certain conditions. The means provided for this purpose comprise an additional pressure plate 257 and control means therefor. The rock lever 207, the rock shaft 208, the rock yoke 209, the shifter yoke 210, the shifter ring 211, the swivel connection 212, the links 213, the rockers 214, the bifurcated rockers 216, the rollers 218, the links 219, and the pressure plate 220 may be substantially the same as that shown in Fig. 14. In addition to these, the clutch shown in Fig. 15 comprises the pressure plate 257 connected by links 258 to bifurcated rockers 259 which also may be controlled by the rockers 214. The contour of the bifurcated rockers 259 engageable with the rollers 218 is different from that of the bifurcated rockers 216 including an extension 260 so formed that the final movement of the rollers 218 will effect a shift of the bifurcated rockers 259 to move their upper ends to the right to cause the pressure plate 257 to pinch the clutch disc 199 against the other pressure plate 220, thus causing both clutch plates 199 and 202 to rotate simultaneously with the driving clutch head.

With this construction, when the lever 207 is in neutral position, both of the clutch plates 199 and 202 will be disconnected. When the upper end of the lever 207 is moved to its forward left-hand position, the clutch pressure plate 220 will also be moved to its forward position to connect the clutch plate 199 to the driving head 197. This will cause the sun gear 246 to rotate, the ring gear clutch plate being free to rotate forwardly but being held against reverse rotation by the one-way anchor 261. This will give a low speed drive to the driven shaft 249. When pressure is supplied to the piston 262 in the upper cylinder 263, the clutch controlling lever 207 will be moved to the right a sufficient distance to release the front clutch plate 199 and connect the rear clutch plate 202, disconnecting the sun gear 246 and connecting the ring gear 247. Under these conditions, the rear sun gear 251 will be held against reverse rotation by the one-way anchor 252 and the driven shaft 249 will be driven at an intermediate speed by the ring gear 247, the planet gearing 253 and the gear carrier 248 secured to the driven shaft.

If fluid pressure is admitted to the piston 264 of the lower cylinder 265, the clutch lever 207 will be moved still further to the right, causing the pressure plate 257 to be moved to the right sufficiently to grip the front clutch plate 199. Under this condition, with both the sun gear 246 and ring gear 247 connected to rotate with the driving head 197, the drive will be direct, the planetary gearing rotating as a unit with the driving head 197.

The two pistons 262 and 264 are controlled by the control mechanism previously referred to which includes, in addition to the parts previously described, a valve 266 controlling the supply of pressure to the upper cylinder 263, a valve 267 controlling the supply of pressure to the lower cylinder 265, a rock arm 268 pivotally mounted at 88 and having a finger 269 for engaging with arms 270 on the valve 266, a rock arm 271 pivotally mounted at 88 having a finger 272 engaging the arms on the other valve 267, and a spring arm 273 frictionally engageable with arcuate friction surfaces 274 and 275 on the arms 267 and 271, respectively.

As described, in connection with Fig. 6, the friction wheel 89 will adjust itself along the surface of the friction disc 95 until its peripheral speed equals the surface speed of that portion of the disc 95 which it engages. As the driven shaft 249 increases in speed, the friction wheel 89 will move to the right, causing the upper end of the spring friction arm 273 to move to the left. In its movement to the left, it will actuate the rock arm 268 to move this rock arm to the left, opening the valve 266 supplying pressure to the upper short stroke piston 262. This supply of pressure to the upper short stroke piston will move the upper end of the clutch lever 207 to the right sufficiently to disconnect the front clutch plate 199 and connect the rear clutch plate 202. This will effect a shift from low to intermediate gear. If the speed of the driven shaft 249 continues to increase in speed with respect to the driving shaft 265, the friction wheel 89 will shift still further to the right and will eventually move the spring friction finger 273 into engagement with the arcuate surface 275 of the left-hand rock arm 271, causing the valve 267 to open and admit pressure to the long stroke piston 264. This will move the clutch lever 207 still further to the right and cause the clutch pressure plate 257 to grip the front friction plate 199 and press it against the other pressure plate 220 to cause the sun gear 246 as well as the ring gear 247 to rotate with the driving clutch head 197, thus effecting a shift from intermediate to high.

The purpose of the frictional engagement between the spring friction arm 273 and the friction surfaces 274 and 275 is to effect a closing of the valve by a movement of the spring arm to the right which might be desirable in case the speed of the driven shaft with respect to the drive shaft should begin to decrease.

Further modifications will be apparent to those skilled in the art and it is desired, therefore, that the invention be limited only by the scope of the appended claims.

Having thus described my invention, what I claim and desire to secure by Letters Patent is:

1. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising means driven in timed relation to the pump rotor and means driven in timed relation to the turbine rotor.

2. A transmission and controller comprising a hydraulic transmission mechanism including a pump rotor, a turbine rotor driven by said pump rotor and having an infinitesimally variable speed ratio with respect thereto, and a reaction stator acting between said pump rotor and turbine rotor, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor comprising an actuator for selectively conditioning the positive transmission mechanism for its two stages, and means controlled by the relative speed of the rotors for controlling the time of operation of said actuator comprising means driven in timed relation to the pump rotor and means driven in timed relation to the turbine rotor.

3. A transmission and controller comprising a hydraulic transmission mechanism including a pump rotor and a turbine rotor driven by said pump rotor and having an infinitesimally variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising means driven in timed relation to the pump rotor and means driven in timed relation to the turbine rotor, said positive transmission comprising a three-element planetary gearing coaxial with said rotors and said actuator comprising a clutch member connectible and disconnectible with respect to one of the elements of the planetary gearing for controlling its rotation.

4. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising means driven in timed relation to the pump rotor, means driven in timed relation to the turbine rotor, two intermeshing gears driven by said timed means respectively, and means whereby when the relative speed of said timed means reaches a predetermined ratio said gears will operate to cause said actuator to effect a transformation in the positive transmission.

5. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising means driven in timed relation to the pump rotor, means driven in timed relation to the turbine rotor, two intermeshing gears driven by said timed means respectively, and means whereby when the relative speed of said timed means reaches a predetermined ratio said gears will operate to cause said actuator to effect a transformation in the positive transmission, one of said gears being frictionally driven and the other having a lost motion helical engagement with its timed drive means.

6. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising reciprocable means positioned in accordance with the relative speed of said rotors.

7. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising reciprocable means positioned in accordance with the speed of said pump rotor, and reciprocable means positioned in accordance with the speed of the turbine rotor.

8. A transmission and controller comprising a hydraulic transmission mechanism including a pump rotor and a turbine rotor driven by said pump rotor and having an infinitesimally-variable speed ratio with respect thereto, a two-stage positive transmission mechanism in series power flow relation with respect to said hydraulic transmission mechanism, each stage having a fixed definite speed-transmitting ratio, and means for transforming said positive transmission mechanism from one stage to the other controlled as to time of transformation by the variation in speed ratio of the turbine rotor with respect to the pump rotor, comprising an actuator for selectively conditioning the positive transmission mechanism for its two stages, and means controlled by the relative speed of the rotors for controlling the time of operation of said actuator comprising a first friction rotor driven in timed relation to one of said hydraulic rotors, and a second friction rotor engaging said first friction rotor driven in timed relation to the other hydraulic rotor and self-adjusting with respect to said first rotor to a non-slip position.

WILLARD L. POLLARD.